(12) United States Patent
Lee

(10) Patent No.: US 9,772,733 B2
(45) Date of Patent: Sep. 26, 2017

(54) TOUCH SIGNAL DETECTION APPARATUS AND TOUCH SIGNAL DETECTION METHOD

(71) Applicant: G2TOUCH Co., LTD, Seongnam (KR)

(72) Inventor: Sung Ho Lee, Hwaseong (KR)

(73) Assignee: G2TOUCH CO., LTD, Seongnam (KR)

( * ) Notice: Subject to any disclaimer, the term of this patent is extended or adjusted under 35 U.S.C. 154(b) by 44 days.

(21) Appl. No.: 14/961,593

(22) Filed: Dec. 7, 2015

(65) Prior Publication Data

US 2016/0170529 A1 Jun. 16, 2016

(30) Foreign Application Priority Data

Dec. 10, 2014 (KR) ........................ 10-2014-0177765

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01); *G06F 2203/04107* (2013.01)

(58) Field of Classification Search
CPC ...... G06F 3/044; G06F 3/0418; G06F 3/0412; G06F 3/0416; G06F 2203/04107
See application file for complete search history.

(56) References Cited

U.S. PATENT DOCUMENTS

| | | | | |
|---|---|---|---|---|
| 2006/0187142 A1* | 8/2006 | Lesniak | ................ | G06F 3/1431 345/1.1 |
| 2009/0314621 A1* | 12/2009 | Hotelling | .............. | G06F 3/0416 200/600 |
| 2011/0261005 A1* | 10/2011 | Joharapurkar | ........ | G06F 3/0418 345/174 |
| 2013/0335376 A1* | 12/2013 | Lee | ........................ | G06F 3/0416 345/174 |
| 2015/0116261 A1* | 4/2015 | Ahn | ...................... | G06F 3/0418 345/174 |

FOREIGN PATENT DOCUMENTS

| | | |
|---|---|---|
| KR | 10-1085086 B1 | 11/2011 |
| KR | 10-2013-0035243 A | 4/2013 |
| KR | 10-2013-0136362 A | 12/2013 |
| KR | 10-2014-0121658 A | 10/2014 |
| WO | WO 2012/121517 | * 9/2012 |

* cited by examiner

*Primary Examiner* — Md Saiful A Siddiqui

(57) ABSTRACT

Disclosed herein is a capacitive touch input apparatus of a human finger or a touch input means having conductive characteristics similar thereto, and more particularly, are a touch signal detection apparatus and a touch signal detection method capable of being widely used for a touch detection sensor having different array arrangements. According to the touch signal detection apparatus and the touch signal detection method according to the present invention, one touch signal detection apparatus may be widely used for the touch detection sensor having different arrays by using a re-map technology. According to the touch signal detection apparatus and the touch signal detection method according to the present invention, it is possible to save costs using the same touch signal detection apparatus without producing the separate touch signal detection apparatus for a display device including the touch detection sensor having different arrays.

13 Claims, 10 Drawing Sheets

<PRIOR ART>

<PRIOR ART>

<PRIOR ART>

<PRIOR ART>

<PRIOR ART>

<PRIOR ART>

FIG.12A

| C1, R1 | C2, R2 | C3, R3 | C4, R4 |
|--------|--------|--------|--------|
| C1, R2 | C2, R3 | C3, R4 | C4, R5 |
| C1, R3 | C2, R4 | C3, R5 | C4, R6 |
| C1, R4 | C2, R5 | C3, R6 | C5, R1 |
| C1, R5 | C2, R6 | C4, R1 | C5, R2 |
| C1, R6 | C3, R1 | C4, R2 | C5, R3 |
| C2, R1 | C3, R2 | C4, R3 | C5, R4 |

FIG.12B

| C1, R1 | C2, R1 | C3, R1 | C4, R1 | C5, R1 |
|--------|--------|--------|--------|--------|
| C1, R2 | C2, R2 | C3, R2 | C4, R2 | C5, R2 |
| C1, R3 | C2, R3 | C3, R3 | C4, R3 | C5, R3 |
| C1, R4 | C2, R4 | C3, R4 | C4, R4 | C5, R4 |
| C1, R5 | C2, R5 | C3, R5 | C4, R5 | C5, R5 |
| C1, R6 | C2, R6 | C3, R6 | C4, R6 | C5, R6 |

TOUCH SIGNAL DETECTION APPARATUS AND TOUCH SIGNAL DETECTION METHOD

CROSS-REFERENCE TO RELATED APPLICATIONS

This application claims priority from and the benefit of Korean Patent Application No. 10-2014-0177765, filed on Dec. 10, 2014, which is hereby incorporated by reference for all purposes as if fully set forth herein.

BACKGROUND OF THE INVENTION

Field of the Invention

The present invention relates to a capacitive touch input apparatus of a human finger or a touch input means having conductive characteristics similar thereto, and more particularly, to a touch signal detection apparatus and a touch signal detection method capable of being widely used for a touch detection sensor having different array arrangements.

Discussion of the Background

Generally, a touch screen panel is attached on display devices such as a liquid crystal display (LCD), a plasma display panel (PDP), and an organic light emitting diode (OLED), an active matrix organic light emitting diode (AMOLED) and is one of the input apparatuses that generate signals corresponding to positions where objects such as a finger and a pen are touched. The touch screen panel has been used in wide applications such as small portable terminals, industrial terminals, and digital information devices (DIDs).

Typically, various types of touch screen panels have been disclosed. However, a resistive touch screen panel having simple manufacturing process and low manufacturing costs has been most widely used. However, the resistive touch screen panel has the low transmissivity and needs to be applied with a pressure, For this reason, the resistive touch screen panel is inconvenient to use, has a difficulty in implementing a multi touch and a gesture cognition, leads to a detection error, etc.

On the other hand, a capacitive touch screen panel may have high transmissivity, cognize a soft touch, and implement better multi touch and gesture cognition. As a result, the capacitive touch screen panel is gradually expanding into new markets.

FIG. 1 illustrates an example of the existing capacitive touch screen panel. Referring to FIG. 1, transparent conductive layers are formed on upper and lower surfaces of a transparent substrate 2 made of plastic, glass, etc., and voltage applying metal electrodes 4 are formed at each of the four corners of the transparent substrate 2. The transparent conductive layer is made of transparent metals such as indium tin oxide (ITO) and antimony tin oxide (ATO). Further, the metal electrodes 4 formed at four corners of the transparent conductive layer are formed by being printed with conductive metal having low resistivity such as silver Ag. A resistance network is formed around the metal electrodes 4. The resistance network is formed in a linearization pattern to equally send out a control signal to the whole surface of the transparent conductive layer. Further, an upper portion of the transparent conductive layer including the metal electrode 4 is coated with a passivation layer.

In the capacitive touch screen panel as described above, a high-frequency alternating voltage is applied to the metal electrode 4 and thus is conducted over the whole surface of the transparent substrate 2. In this case, when the transparent conductive layer on an upper surface of the transparent substrate 2 is light touched with a finger 8 or a conductive touch input means, a change in current is sensed by a current sensor embedded in a controller 6 while a predetermined amount of current is absorbed into a body and current amounts at each of the four metal electrodes 4 are calculated, thereby cognizing touched points.

However, the capacitive touch screen panel as illustrated in FIG. 1 is based on a method for detecting a magnitude of micro current. As a result, the capacitive touch screen panel needs an expensive detection apparatus and therefore a price of the capacitive touch screen panel goes up and the capacitive touch screen panel is hard to implement a multi touch for cognizing a plurality of touches.

To overcome the above problems, the capacitive touch screen panel as illustrated in FIG. 2 has been mainly used in recent years. The touch screen panel of FIG. 2 is configured to include a lateral linear touch detection sensor 5a, a longitudinal linear touch detection sensor 5b, and a touch drive IC 7 analyzing a touch signal. The touch screen panel is based on a method for detecting a magnitude of capacitance formed between the linear touch detection sensor 5 and the finger 8 and scans the lateral linear touch detection pad 5a and the longitudinal linear touch detection pad 5b to detect a signal, thereby cognizing the plurality of touched points.

However, when the above-mentioned touch screen panel is installed on a display device such as an LCD, the touch screen panel is hard to detect a signal due to noise. For example, the LCD uses a common electrode applied with a common voltage Vcom that is commonly applied to a liquid crystal. In this case, the common voltage is affected by a pixel voltage applied to the liquid crystal and therefore may be fluctuated. As a result, the common voltage Vcom of the common electrode acts as noise upon detecting the touched point.

Further, unlike the effect of the fluctuation of the common voltage on the touch signal, a scan signal may affect the common voltage upon scanning the lateral linear touch detection sensor 5a and the longitudinal linear touch detection sensor 5b to acquire touch signals to cause deterioration in image quality.

FIG. 3 illustrates an embodiment in which the existing capacitive touch screen panel is installed on the LCD. A display device 200 has a structure in which a liquid crystal is sealed between a TFT substrate 205 at a lower portion thereof and a color filter 215 at an upper portion thereof to form a liquid crystal layer 210. To seal the liquid crystal, the TFT substrate 205 and the color filter 215 are bonded to each other by having a sealant 230 disposed at outer portions thereof. Although not illustrated, polarizing plates are attached to upper and lower portions of a liquid crystal panel and back light units (BLUs) are additionally installed at the liquid crystal panel.

As illustrated, the touch screen panel is installed at the upper portion of the display device 200. The touch screen panel has a structure in which the linear touch detection sensor 5 is put on an upper surface of the substrate 1. A protection panel 3 for protecting the linear touch detection sensor 5 is attached on the substrate 1. The touch screen panel is bonded to an edge portion of the display device 200 by an adhesive member 9 such as a double adhesive tape (DAT), in which an air gap 9a is formed between the touch screen panel and the display device 200.

In this configuration, when a touch is performed as illustrated in FIG. 3, a capacitance such as Ct is formed between the finger 8 and the linear touch detection sensor 5.

However, as illustrated, a capacitance such as common electrode capacitance Cvcom is also formed between the linear touch detection sensor 5 and the common electrode 200 formed on a lower surface of the color filter 215 of the display device 200 and an unknown parasitic capacitance Cp that occurs due to a capacitance coupling between patterns, manufacturing process factors, etc., is also applied to the linear touch detection sensor 5. Therefore, a circuit like an equivalent circuit of FIG. 4 is configured.

Here, the existing touch screen panel detects a variation of Ct that is a touch capacitance to cognize a touch and components such as Cvcom and Cp act as noise upon detecting the Ct. In particular, the common electrode capacitance Cvcom may also be ten times larger than the Ct that is the touch capacitance. As a result, there is a problem in that touch sensitivity may be reduced due to a distortion of the touch signals due to the fluctuation of the Cvcom and the touch capacitance ten times larger than the Ct.

To solve the above problem, a touch signal detection method with a new structure to reduce the Cvcom has been proposed. FIG. 5 illustrates an embodiment of a method for reducing Cvcom. The method for reducing Cvcom separates the linear sensor of FIG. 2 into several to reduce the Cvcom, thereby solving problems such as the reduction in sensitivity or the effect on the display device. However, in the structure, since the number of touch detection sensors 10 is more than the number of linear sensors 5 of FIG. 2, the plurality of touch detection sensors 10 need to detect the touch signals to meet a touch signal report time. In this case, upon simultaneously detecting the touch signals in row signals (for example, (Col1, Row1) and (Col1, Row2)) adjacent to the same column, the interference of the touch signals may occur due to the parasitic capacitance Cp between sensor signal lines 22 connected to each of the touch detection sensors 10.

FIG. 6 illustrates an embodiment in which the interference of the touch signals occurs upon simultaneously detecting the touch signals in (C1, R1) 22-*a* and (C1, R2) 22-*b*. Referring to FIGS. 5 and 6, a sensing pad signal line 22*a* of FIG. 6 which is adjacent to the signal line 22*b* in FIG. 5 is connected to a touch drive IC (TDI) and the parasitic capacitance Cp is formed between the signal line 22*a* and the signal line 22*b*. Upon detecting the touch signals by the (C1, R1) touch detection sensor of FIG. 6 using a driving back phenomenon (see Patent Application No. 2012-0109309), the (C1, R1) and the (C1, R2) may be affected to each other due to the parasitic capacitance Cp and therefore an error of the touch signal detection occurs.

RELATED ART DOCUMENT

Patent Document (Patent Document 1) Patent Application No. 2012-0109309
Title: Touch signal detection apparatus using driving back phenomenon, detection method, touch screen panel, and display device having touch screen panel embedded therein.

SUMMARY OF THE INVENTION

An object of the present invention is to provide a touch signal detection apparatus and a touch signal detection method capable of being widely used for a touch detection sensor having different array arrangements and preventing signal interference between a plurality of touch detection sensors 10 when the touch detection sensors 10 detect touch signals.

As described above, a characteristic configuration of present invention is as follows for achieving the above objects of the present invention and specific effects of the present invention.

According to an exemplary embodiment of the present invention, there is provided a touch signal detection apparatus detecting whether a touch is performed at a touch pad including a plurality of touch detection sensors arranged in a matrix form, the touch signal detection apparatus including: a memory unit receiving and storing touch signals through a plurality of touch signal lines connected to the plurality of touch detection sensors of each column to transfer the touch signals generated from the touch detection sensor, a storage array of the memory unit being different from an array of the touch detection sensors; and a touch detection unit detecting the touch signals stored in the memory unit to determine whether the touch is performed, in which a re-map process may be performed to match the touch signals stored in the memory unit with the array of the touch detection sensors.

The touch signal detection apparatus may further include: a plurality of multiplexers receiving the touch signals through the plurality of touch signal lines connected to the plurality of touch detection sensors of each column to transfer the touch signals generated from the touch detection sensors; and at least one selection signal generator generating a selection signal for selecting some of the touch signals received by each of the multiplexers.

The memory unit may separate and store the touch signals into a group depending on an output of the multiplexer and the number of input pins receiving the touch signals of each of the multiplexers may not coincide with the number of touch signal lines at each column of the touch detection sensors connected to the input pins.

The overall number of input pins of the multiplexers in the touch signal detection apparatus may be more than the overall number of touch signal lines of the touch detection sensor.

The re-map process may re-array the touch signals stored in the memory unit based on coordinates of the column of the touch detection sensor.

Each of the multiplexers may have the same configurations of inputs and outputs and have the same number of inputs, the same number of outputs, the same number of selection signals, and the same order of input signals selected for any selection signal.

Each of the multiplexers may have a multiplexer in which configurations of inputs and outputs are the same and the number of inputs is different.

The touch signal lines input to each of the multiplexers may be disposed having directivity depending on positions of the touch detection sensors of each column.

The directivity may represent that as a number for rows of the touch detection sensors of each column is increased, a number for input pins of the touch signal lines input to each of the multiplexers is increased or as a number for rows of the touch detection sensors of each column is reduced, a number for the input pins of the touch signal lines input to each of the multiplexers is reduced.

Each of the multiplexers may be configured to receive the touch signals through the touch signal lines connected to the touch detection sensors belonging to the same column or to receive the touch signals through the touch signal lines connected to the touch detection sensors belonging to other columns.

The selection signals generated from the selection signal generator may be commonly applied to each of the multiplexers.

The selection signal may be configured to send out only one output of the inputs of the multiplexers.

The touch detection sensor corresponding to the one output selected by the selection signal may be a sensing pad and determines whether the touch is performed by the touch detection unit and the rest touch detection sensors other than the sensing pad may be non-sensing pads and may be connected to a zero voltage, a ground voltage, or a DC voltage.

All the voltages of the non-sensing pads may be the same.

The touch signal lines may be disposed at a left or a right of the touch detection sensor.

A touch detection resolution may be changed by changing positions of the touch detection sensors that are positioned at different columns or different rows in a horizontal direction or a vertical direction.

When the touch detection resolution is changed, the touch detection sensors may be scanned at several rows.

The touch signal detection apparatus may further include: a charging means charging a parasitic capacitance Cp and a driving capacitance Cdrv present in the touch pad and a touch capacitance Ct formed between the touch detection sensor and a touch input tool; an alternating voltage applying unit applying an alternating voltage to the touch detection sensor; and a level shift detection unit comparing a voltage variation at the touch detection sensor when the touch is not performed with the voltage variation at the touch detection sensor when the touch is performed to determine whether the touch is performed.

The charging means may be turned off after the completion of the charging to apply the alternating voltage in a state in which the parasitic capacitance Cp, the driving capacitance Cdrv, and the touch capacitance Ct are maintained in a floating state.

An input terminal of the level shift detection unit may maintain a high impedance (Hi-Z) state upon the determination on whether the touch is performed.

The voltage variation at the touch detection sensor when the touch is performed may be smaller than that at the touch detection sensor when the touch is not performed.

The voltage fluctuation at the touch detection sensor when the touch is performed and the voltage fluctuation at the touch detection sensor when the touch is not performed may be generated by being linked with a rising edge and a falling edge of the alternating voltage.

According to another exemplary embodiment of the present invention, there is provided a touch signal detection method detecting whether a touch is performed at a touch pad including a plurality of touch detection sensors arranged in a matrix form, the touch signal detection method including: a storing step of receiving and storing, by a memory unit, touch signals through a plurality of touch signal lines connected to the plurality of touch detection sensors of each column to transfer touch signals generated from the touch detection sensors; and a touch detection step of determining, by a touch detection unit, whether a touch is performed by detecting the touch signals selected by a selection signal among the touch signals stored in the memory unit, in which a re-map process may be performed to match the touch signals stored in the memory unit with an array of the touch detection sensors.

The touch signal detection method may further include: a step of receiving, by a plurality of multiplexers, the touch signals through the plurality of touch signal lines connected to the plurality of touch detection sensors of each column to transfer the touch signals generated from the touch detection sensors; and a step of generating, by at least one selection signal generator, the selection signal for selecting some of the touch signals received by each of the multiplexers.

The memory unit may separate and store the touch signals into a group depending on an output of the multiplexer and the number of input pins receiving the touch signals of each of the multiplexers may not coincide with the number of touch signal lines at each column of the touch detection sensors connected to the input pins.

The re-map process may be added to match the touch signals stored in the memory unit with the array of the touch detection sensors.

The re-map process may re-array the touch signals stored in the memory unit based on coordinates of the column of the touch detection sensor.

Configurations of inputs and outputs of each of the multiplexers may be the same and the selected number of touch signals to the number of received touch signals may be configured to be the same.

Each of the multiplexers may have a multiplexer in which the configurations of inputs and outputs are the same and the number of inputs is different.

The touch signal lines input to each of the multiplexer may be disposed having directivity depending on positions of the touch detection sensors of each column.

The directivity may represent that as a number for rows of the touch detection sensors of each column is increased, a number for input pins of the touch signal lines input to each of the multiplexers is increased or as a number for rows of the touch detection sensors of each column is reduced, a number for the input pins of the touch signal lines input to each of the multiplexers is reduced.

Each of the multiplexers may be configured to receive the touch signals through the touch signal lines connected to the touch detection sensors belonging to the same column or to receive the touch signals through the touch signal lines connected to the touch detection sensors belonging to other columns.

The selection signals generated from the selection signal generator may be commonly applied to each of the multiplexers.

The selection signal may be configured to send out only one output of the inputs of the multiplexers.

The touch detection sensor corresponding to the one output selected by the selection signal may be a sensing pad and determines whether the touch is performed by the touch detection unit and the rest touch detection sensors other than the sensing pad may be non-sensing pads and may be connected to a zero voltage, a ground voltage, or a DC voltage.

All the voltages of the non-sensing pads may be the same.

The touch detecting step may include: a step of charging, by a charging means, a parasitic capacitance Cp and a driving capacitance Cdrv present in the touch pad and a touch capacitance Ct generated by the conductor; a step of applying, by an alternating voltage applying unit, an alternating voltage to the touch detection sensor; and a level shift detecting step of comparing, by a level shift detection unit, a voltage variation at the touch detection sensor when the touch is not performed with the voltage variation at the touch detection sensor when the touch is performed to determine whether the touch is performed.

The charging means may be turned off after the completion of the charging to apply the alternating voltage in a state in which the parasitic capacitance Cp, the driving capacitance Cdrv, and the touch capacitance Ct are maintained in a floating state.

An input terminal of the level shift detection unit may maintain a high impedance (Hi-Z) state upon the determination on whether the touch is performed.

The voltage variation at the touch detection sensor when the touch is performed may be smaller than that at the touch detection sensor when the touch is not performed.

The voltage fluctuation at the touch detection sensor when the touch is performed and the voltage fluctuation at the touch detection sensor when the touch is not performed may be generated by being linked with a rising edge and a falling edge of the alternating voltage.

BRIEF DESCRIPTION OF THE DRAWINGS

FIGS. 12A and 12B are diagrams describing a re-map process.

DETAILED DESCRIPTION OF THE ILLUSTRATED EMBODIMENTS

Figure 1:
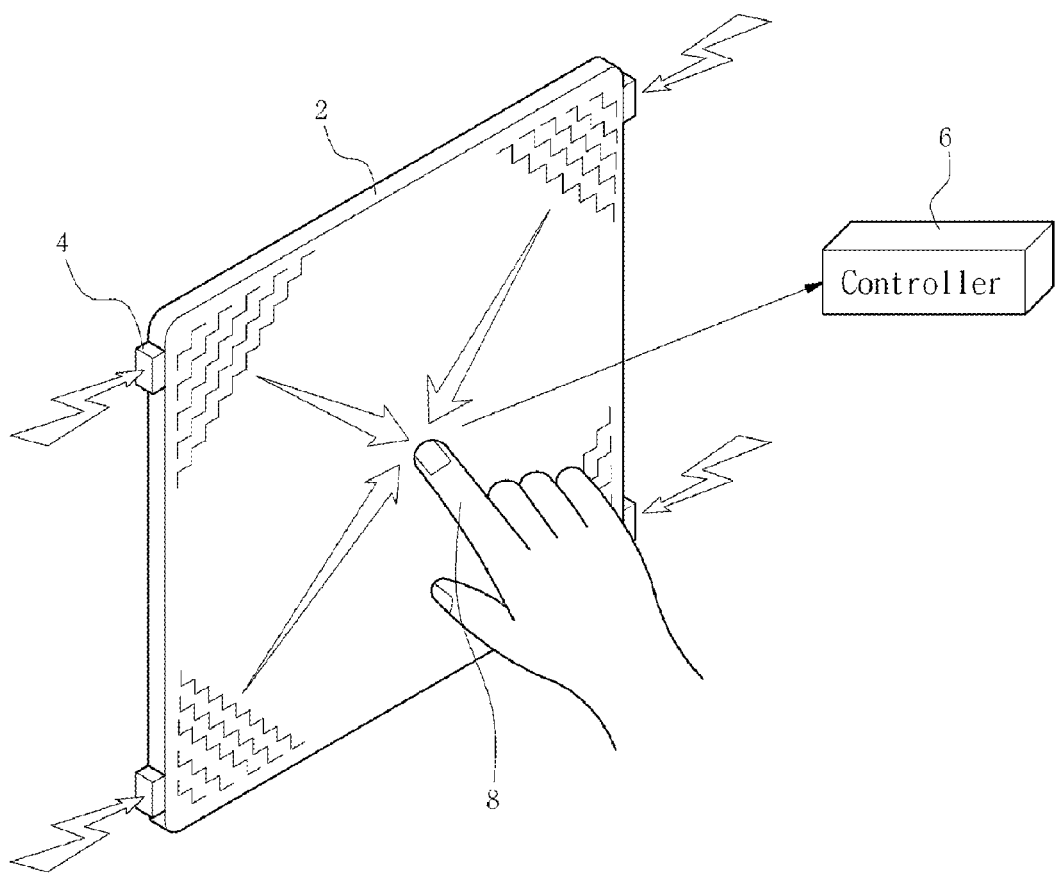
FIG. 1 is a perspective view illustrating an example of the existing touch screen panel.
Figure 2:
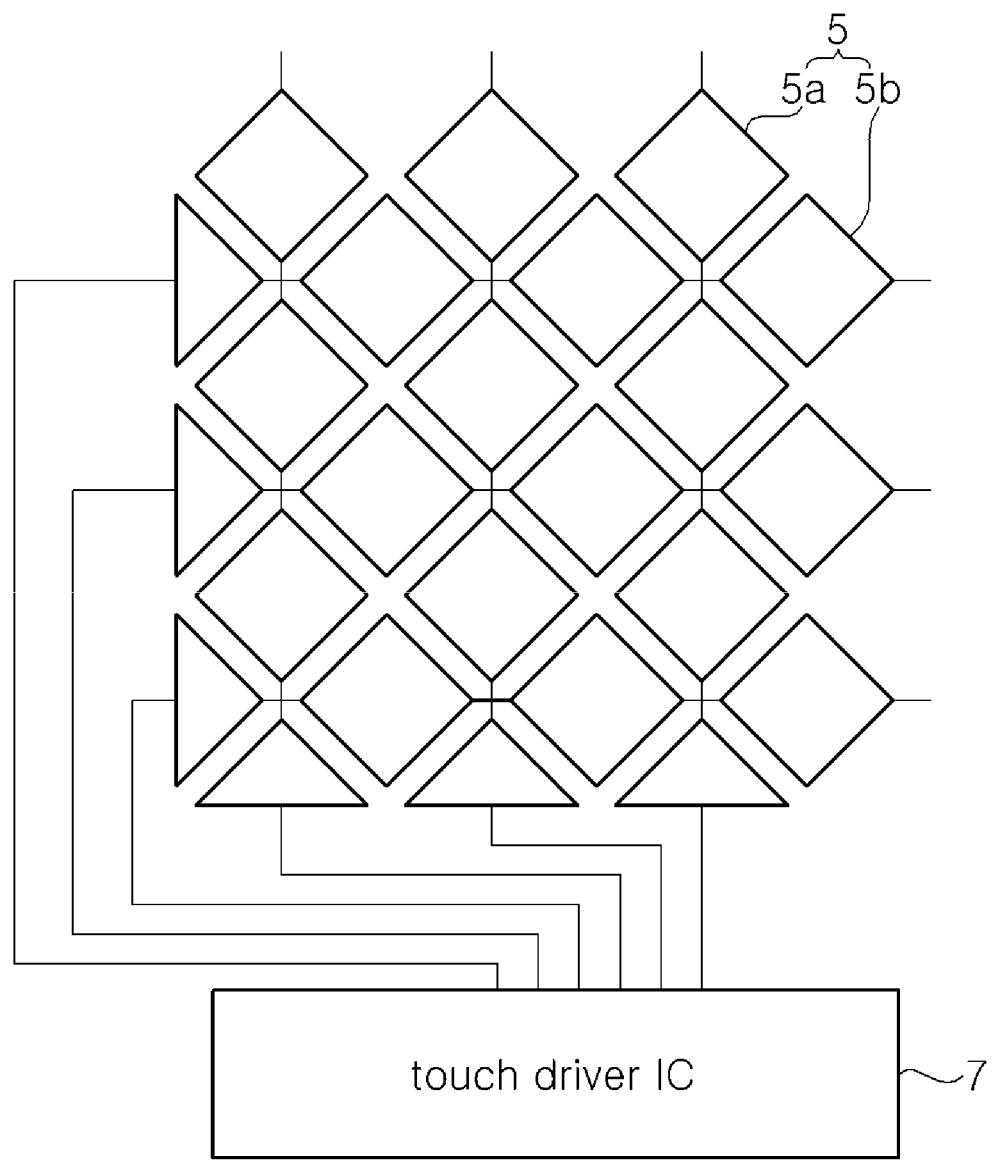
FIG. 2 is a plan configuration diagram illustrating another example of the existing touch screen panel.
Figure 3:
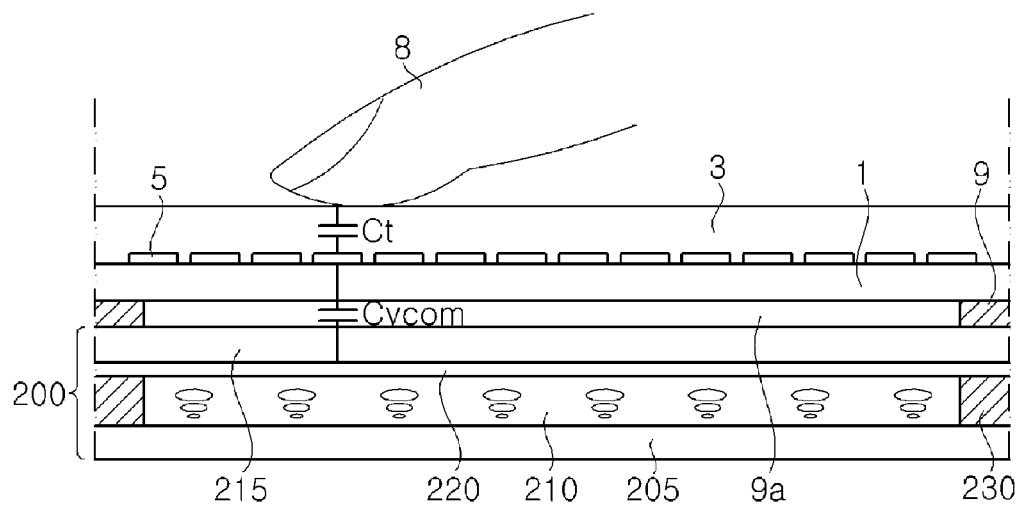
FIG. 3 is a cross-sectional view illustrating an example in which the touch screen panel of the FIG. 2 is installed on a display device.
Figure 4:
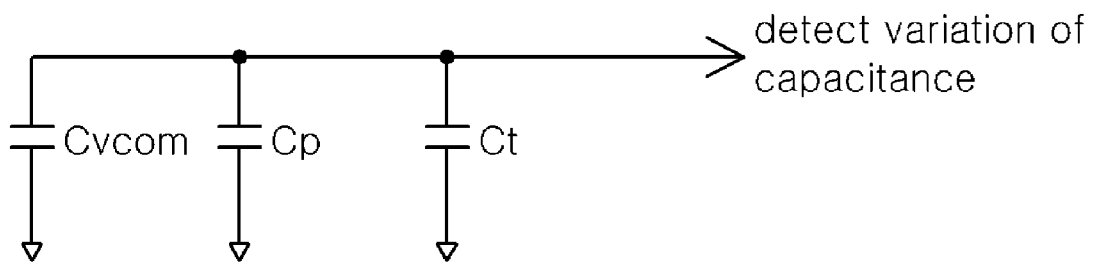
FIG. 4 is an equivalent circuit diagram detecting a touch capacitance in FIG. 3.

Hereinafter, exemplary embodiments of the present invention will be described in detail with reference to the accompanying drawings.

A display device described in the present invention means any one of LCD, PDP, and OLED and means all means displaying other images.

Among the display devices listed above, the LCD requires a common voltage Vcom to drive a liquid crystal. For example, a small and medium portable LCD uses a line inversion scheme in which a common voltage of a common electrode alternates in one line or each of the plurality of gate lines, to thereby reduce current consumption. As another example, a large LCD uses a dot inversion driving scheme in which a common voltage of a common electrode has a constant DC level. As another example, an in-plane switching mode LCD displays an image by the line inversion scheme or the dot inversion driving scheme in which the common electrode is formed in a part of an area of a TFT substrate configuring the LCD. In the case of the in-plane switching mode LCD, a back ground is commonly formed over the whole of a color filter exposed to the outside through a back indium tin oxide (ITO) and is grounded to a ground signal to cut off electrostatic discharge (ESD).

According to the exemplary embodiment of the present invention, in addition to the electrode to which the common voltage Vcom is applied, all electrodes commonly acting within the display device are referred to as the "common electrode" and an alternating voltage or a DC voltage applied to the common electrode of the display device or a voltage alternating at a unspecific frequency is referred to as the "common voltage".

The present invention detects a non-contact touch input of a finger or a touch input means having electrical characteristics similar thereto. Here, the "non-contact touch input" means that the touch input means such as a finger performs the touch input in a state in which the touch input means is spaced apart from a touch detection sensor at a predetermined distance by a substrate present between the input means and the touch detection sensor. The touch input means may contact an outer surface of the substrate. However, even in this case, the touch input means and the touch detection sensor maintains a non-contact state. Therefore, a touch behavior of a finger to the touch detection sensor may be expressed by the term "approach" Meanwhile, since the finger comes into contact with the outer surface of the substrate, the touch behavior of the finger to the substrate may be expressed by the term "contact". In the present specification, the "approach" and the "contact" are commonly used.

Further, components such as "~unit" to be described below are a set of unit function elements performing specific functions. For example, an amplifier for any signal is a unit function element and a set of amplifiers or signal converters may be named a signal conversion unit. Further, the "~unit" may be included in an upper-level component or another "~unit" or may include lower-level components and "~units". Further, the "~unit" itself may also have a standalone CPU.

In the drawings, to clearly represent layers and regions, a thickness or a region is exaggerated in the drawings for clarity. Like reference numerals designate like elements throughout the specification. It will be understood that when an element such as a layer, a region, a substrate is referred to as being "on" another element or an "upper surface", it may be "directly on" another element or may have an intervening element present therebetween. In contrast, the meaning that an element is "directly on" another element is that there are no intervening elements therebetween.

Further, a "signal" described in the present specification is collectively referred to as a voltage or a current unless specially indicated.

Further, in the present specification, a "capacitance" represents a physical magnitude and is used as the same meaning as "static capacity". Meanwhile, a "capacitor" is referred to as an element having a capacitance which is a physical magnitude.

In the present specification, sign C used as a sign of a capacitor is used as a sign representing a capacitor and represents a capacitance which is a magnitude of the capacitor. For example, C1 is a sign representing a capacitor and a capacitance which is the magnitude of the capacitor means C1.

Further, in the present specification, the meaning "forcing a signal" means that a level of a signal maintaining any state is changed. For example, the meaning that a signal is forced to an on/off control terminal of a switching element means that the existing low level voltage is changed to a high level.

Figure 9:
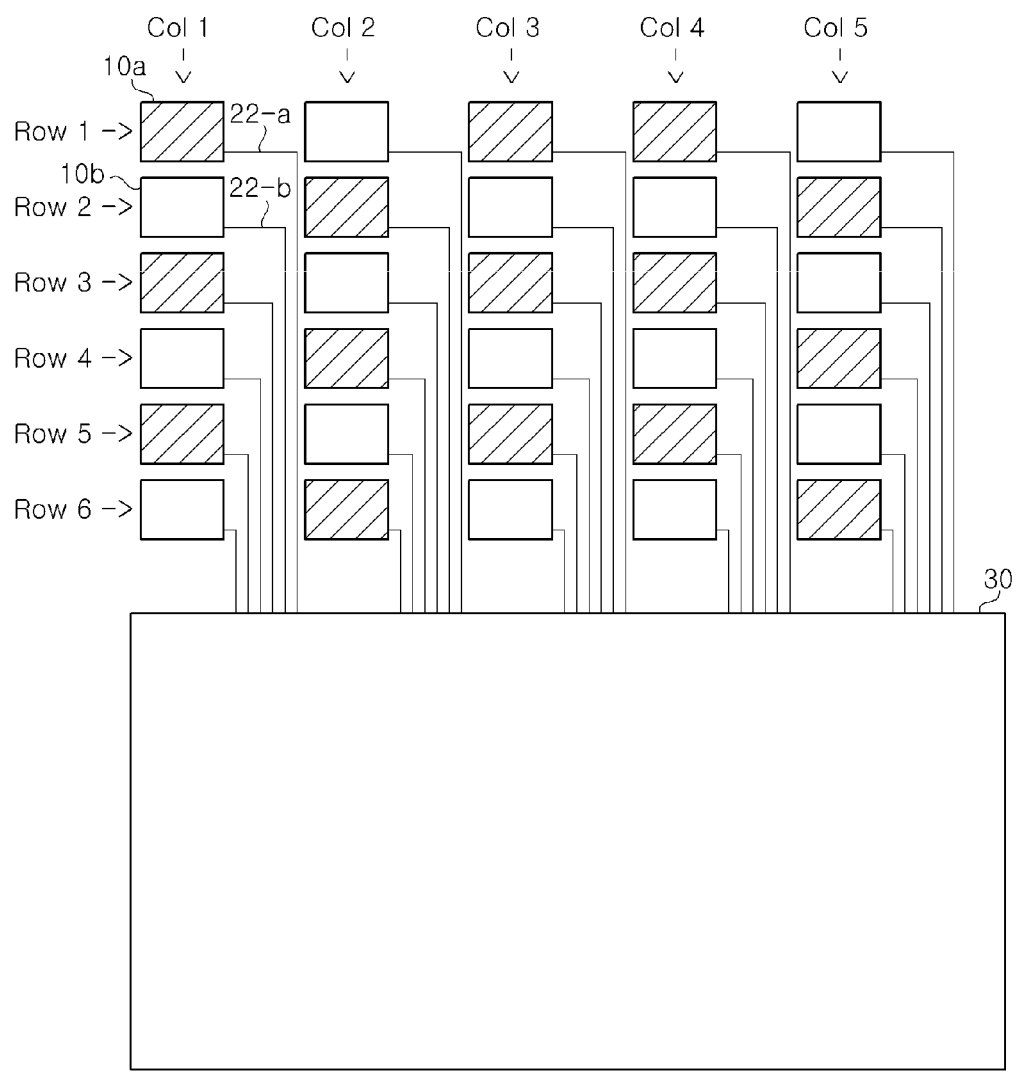
FIG. 9 is a diagram illustrating an embodiment in which the problem that a width of a sensor signal line is wide is solved, according to an exemplary embodiment of the present invention.

Further, in the present specification, a touch detection sensor 10 is configured to include a sensing pad 10a (shaded touch detection sensor of FIG. 9) and a non-sensing pad 10b (non-shaded touch detection sensor of FIG. 9). The sensing pad 10a is the touch detection sensor 10 (that is, touch detection sensor simultaneously determining whether the touch is performed by the touch detection unit 14) connected to the touch detection unit 14 to detect touches and the non-sensing pad 10b is the touch detection sensor 10 (that is, touch detection sensor not simultaneously determining whether the touch is performed upon the determination on whether the touch is performed by the sensing pad) that does not perform touch detection and is not connected to the touch detection unit 14, among a plurality of touch detection sensors 10. If the sensing pad 10a becomes the non-sensing pad 10b after completing the touch detection, any non-sensing pad 10b is switched to the sensing pad 10a in a predefined order. Therefore, the sensing pads and the non-sensing pads are not fixed and are sequentially determined in the predefined order. A time sharing technique is an embodiment defining an order. The non-sensing pad 10b may be connected to a DC power supply having a zero voltage, a ground voltage, or a DC voltage having a predetermined magnitude.

Further, in the present specification, detecting a touch or a touch signal has the same meaning and means detecting a difference between a voltage detected by a touch detection unit when a conductor such as a finger does not contact or approach the touch detection sensor 10 and thus a touch capacitance is not formed and a voltage detected by the touch detection unit based on a touch capacitance Ct formed when the conductor such as a finger is opposite to the touch detection sensor.

Further, in the present specification, a touch drive IC is short for TDI.

Further, in the present specification, a precharge and charging and a precharge voltage and a charging voltage are used as the same meaning.

Further, in the present specification, sensing pads and sensor signal lines connecting between the sensing pads are used as the same meaning unless specifically mentioned and non-sensing pads and non-sensing pad signal lines connecting between the non-sensing pads are used as the same meaning unless specifically mentioned.

Further, in the present specification, a column is a direction in which the sensor signal lines are formed in a group and then are toward a TDI 30 and a row is a direction perpendicular to a column direction.

Figure 7:
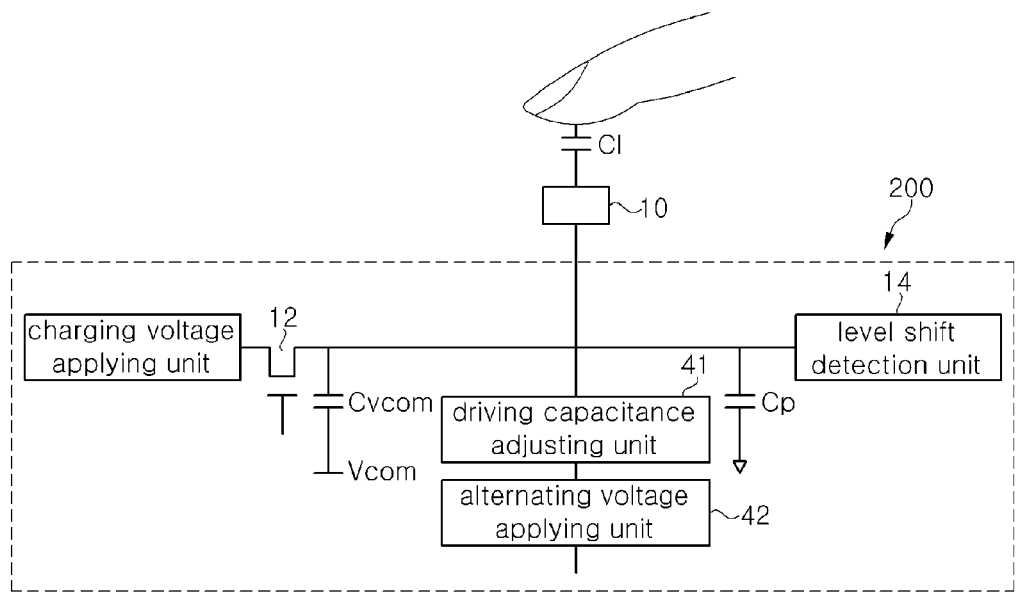
FIG. 7 is a block diagram for describing a configuration of a touch signal detection apparatus 200 according to an exemplary embodiment of the present invention.

FIG. 7 is a block diagram for describing a configuration of a touch signal detection apparatus 200 according to an exemplary embodiment of the present invention. The touch signal detection apparatus 200 according to an exemplary embodiment of the present invention includes the touch detection sensor 10, a driving capacitance adjusting unit 41, an alternating voltage applying unit 42, a charging voltage applying unit, and a level shift detection unit 14 (corresponding to the touch detection unit 14 in FIG. 5).

First, a touch detection operation of the level shift detection unit 14 will be described. The touch detection sensor 10 is an electrode patterned on a substrate to detect a touch input and forms a touch capacitance Ct in a finger or a touch input tool such as a conductor. The touch detection sensor 10 may be formed of a transparent conductor.

For example, the touch detection sensor 10 may be made of transparent materials such as indium tin oxide (ITO), antimony tin oxide (ATO), carbon nano tube (CNT), and indium zinc oxide (IZO). However, as another example, the touch detection sensor 10 may be made of metal.

The touch detection sensor 10 outputs a signal depending on a touched state in response to an alternating voltage in a floating state after charges are charged. For example, the touch detection sensor 10 responds to an alternating voltage Vdrv alternating at a predetermined frequency to output different level shift values when being touched or not being touched by the touch input tool. The touch signal detection apparatus 200 may further include a charging means 12.

The charging means 12 may be a three-terminal type switching element performing a switching operation in response to a control signal supplied to an on/off control terminal or a linear element such as an OP-AMP supplying a signal in response to the control signal. An output terminal of the charging means 12 is connected to a touch capacitance Ct, a parasitic capacitance Cp, and a driving capacitance Cdrv that are applied to the touch detection sensor 10 and the charging means 12 is charged with the Ct, the Cdrv, the Cp, etc., when an input terminal of the charging means 12 is applied with any charging voltage in the state in which the charging means is turned on. Next, when the charging means 12 is turned off, signals charged in the Ct, the Cdrv, etc., are isolated in the changed state unless being separately discharged. In this case, to stably isolate the charged signals, an input terminal of the level shift detection unit to be described below preferably has high impedance. However, when the touch input is observed while the signal charged in the Cdrv, etc., is discharged or when the charged signals are isolated by other means or the touch input may be rapidly observed at discharge starting timing, the input terminal of the level shift detection unit may be enough to have low impedance.

The charges charged in the touch detection sensor 10 by a turn on of the foregoing charging means 12 are isolated depending on a turn off of the charging means 12. The isolated state is called a floating state. The charge of the charging signal isolated between the charging means 12 and the level shift detection unit has a voltage level varying by the alternating voltage applied from the outside to the driving capacitance. The voltage level is different when the touch is performed and when the touch is not performed. The level difference before and after the touch is performed is called a level shift.

The driving capacitance adjusting unit 41 adjusts the driving capacitance formed between the touch detection sensors 10.

The alternating voltage applying unit 42 applies the alternating voltage. In detail, the alternating voltage applying unit applies the alternating voltage alternating at a predetermined frequency to the touch detection sensor 10 to fluctuate a voltage of the touch detection sensor 10.

The level shift detection unit detects the level shift generated by the alternating voltage Vdrv in the floating state. In detail, the level shift detection unit measures a voltage variation at the touch detection sensor 10 when the touch is not performed and a voltage variation at the touch detection sensor 10 when the touch is performed to detect whether the level shift is generated. That is, the voltage of the touch detection sensor 10 rises or falls by the applied alternating voltage Vdrv and the voltage level fluctuation when the touch is performed has a value smaller than that when the touch is not performed. Therefore, the level shift detection unit compares voltage levels before and after the touch is performed to detect the level shift.

Further, the level shift detection unit 14 may acquire the touch signal based on the difference in the voltage variations at the touch detection sensors 10 depending on the alternating voltage before and after the touch is performed.

The level shift detection unit may be configured of a combination of various elements or circuits. For example, the level shift detection unit may be configured of a combination of at least one of an amplification element amplifying a signal of an output terminal of the touch detection sensor 10, an analogue to digital converter (ADC), a voltage to frequency converter (VFC), a flip-flop, a latch, a buffer, a transistor (TR), a thin film transistor (TFT), a comparator, a DAC, etc.

Here, terms used in FIG. 7 are defined as follows.

The touch capacitance Ct means a capacitance formed between the touch detection sensor 10 and a touch input tool such as a finger. The parasitic capacitance Cp means a capacitance included in the touch detection sensor 10 and may include any parasitic capacitance generated in the touch detection sensor 10, between signal wirings, by a layout inside the TDI, etc.

The driving capacitance Cdrv is a capacitance formed in a path through which the alternating voltage Vdrv alternating at a predetermined frequency for each touch detection sensor 10 is supplied and may be present inside the TDI and separately present outside the TDI.

The charging means 12 is a switch, for example, a CMOS. A gate of the CMOS may be applied with a control signal Vg and a source (or drain) thereof may be applied with a charging voltage. Another exemplary embodiment of the present invention may use other elements that may be switched, not the CMOS.

A first input unit of the level shift detection unit may include a voltage follower. The voltage follower may output the same signal as an input signal and the input terminal has high impedance (Hi-z) characteristics. The voltage follower may serve as a buffer.

The charging means 12 is turned on to supply the charging voltage, to thereby charge the driving capacitance Cdrv, the touch capacitance Ct, and the parasitic capacitance Cp. Next, if the charging means 12 is turned off, the input terminal of the voltage follower becomes the high impedance and therefore the charged charges are isolated to maintain the voltage of the touch detection sensor 10, such that a voltage Vnt of the touch detection sensor 10 may be constantly maintained. Next, if the voltage of the alternating voltage Vdrv rises or falls, a voltage Vo level at the output terminal of the touch detection sensor 10 rises or falls by being linked with the alternating voltage.

A voltage fluctuation ΔVnt at the touch detection sensor 10 due to the Cdrv when the touch is not performed depends on the following [Equation 1].

$$\Delta V_{nt} = Vpre \pm (Vh - Vl)\frac{Cdrv}{Cdrv + Cvcom + Cp} \quad \text{[Equation 1]}$$

Since the Ct is added to the Cdrv in parallel when the touch is performed, a voltage fluctuation ΔVtc at the touch detection sensor 10 when the touch is performed depends on the following [Equation 2].

$$\Delta V_{tc} = Vpre \pm (Vh - Vl)\frac{Cdrv}{Cdrv + Cvcom + Cp + Ct} \quad \text{[Equation 2]}$$

In the above Equation 2, ΔV represents the voltage variation at the touch detection sensor 10, Vh represents the high level voltage of the alternating voltage, Vl represents the low level voltage of the alternating voltage, Cdrv represents the driving capacitance, Cp represents the parasitic capacitance, Ct represents the touch capacitance, and Vpre represents the charging voltage and a sign after the Vpre when the alternating voltage rises becomes "+" and a sign after the Vpre when the alternating voltage falls becomes "−".

Reviewing the above [Equation 1] and [Equation 2], in the ΔVtc against the ΔVnt before the touch is performed, the touch capacitance Ct is added to a denominator and therefore the voltage difference occurs, such that the touch signal may be detected when the voltage fluctuations before and after the touch is performed, that is, the level shift is detected.

Figure 5:
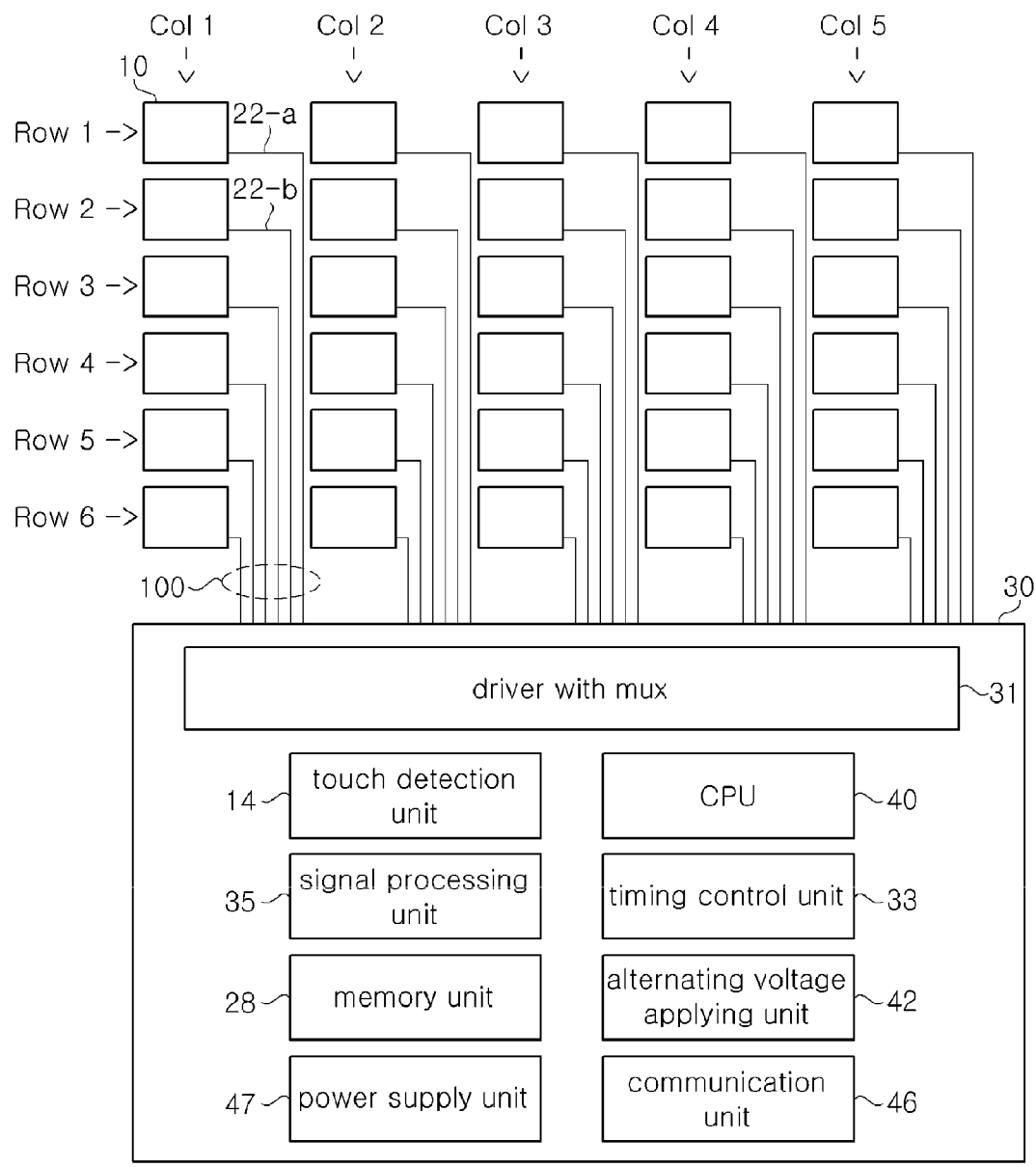
FIG. 5 is a diagram illustrating an embodiment of a method for reducing a common voltage Vcom in the touch screen panel.
Figure 6:
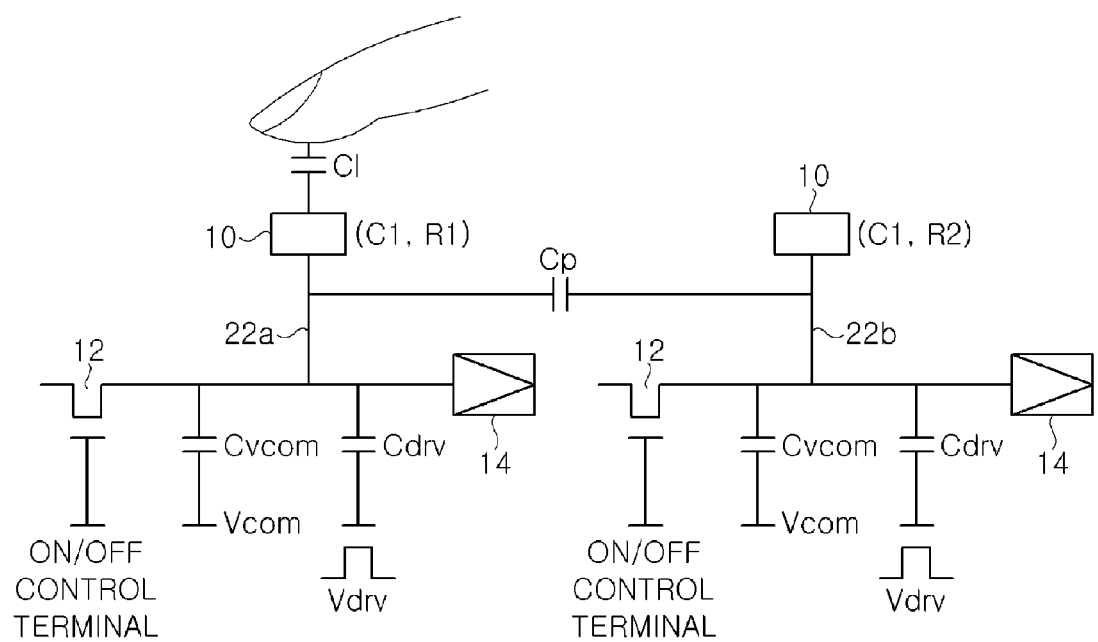
FIG. 6 is a diagram illustrating an embodiment of a case in which an interference of the touch signals occurs when two adjacent touch detection sensors simultaneously detect the touch signals.

In the level shift detection method, when the touch signals at (C1, R1) and (C1, R2) of FIG. 5 are detected at the same time, the two touch detection sensors are connected due to the parasitic capacitance Cp formed between the sensor signal lines as illustrated in FIG. 6 and thus the above [Equation 1] and [Equation 2] are changed, such that the error of the touch detection occurs.

Figure 8:
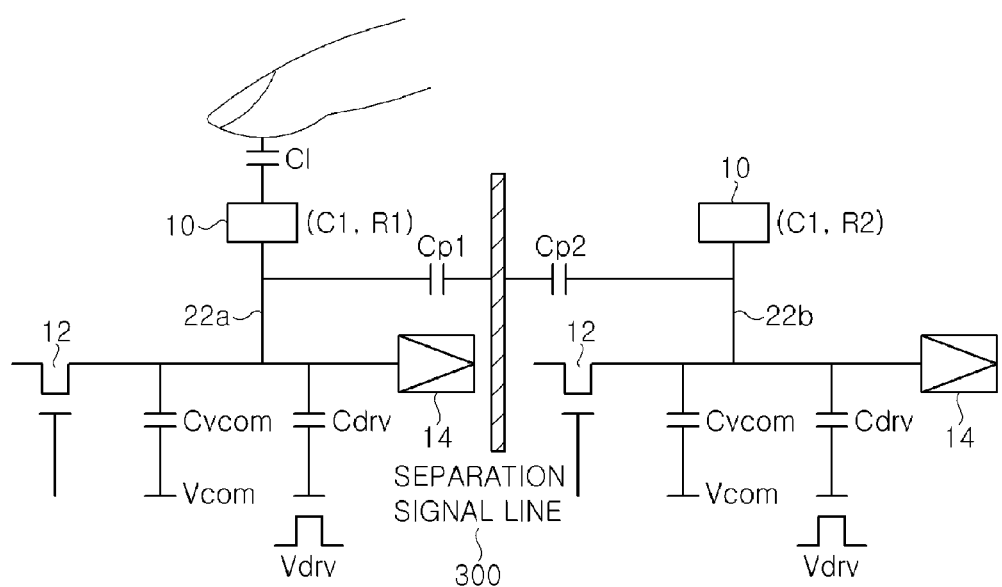
FIG. 8 is a diagram illustrating an embodiment in which an interference problem due to a parasitic capacitance between adjacent sensor signal lines is solved, according to an exemplary embodiment of the present invention.

Referring to FIG. 8, an embodiment of a method for solving the occurrence of the touch signal detection failure due to the parasitic capacitance present between the sensor signal lines 22 when the touch detection sensor 10 and the sensor signal lines 22 are adjacent to each other puts a separate signal line (separation signal line 300) having a ground voltage, a zero voltage, or DC voltage having a predetermined magnitude between the adjacent sensor signal lines and the touch detection sensor. That is, the separate signal line (separation signal line 300) is put between the touch detection sensors 10 of the (C1, R1) and the (C1, R2) of FIG. 5 or the separate signal line (separation signal line 300) is put between the sensor signal lines 22 connected thereto. As a result, the parasitic capacitance Cp of FIG. 6 formed between the adjacent sensor signal lines 22 is separated into two parasitic capacitances Cp1 and Cp2 by the separate signal line (separation signal line 300) and a mutual interference is ruled out.

However, the method inserts the separate signal line (separation signal line 300) between all the sensor signal lines 22, and therefore there is problem in that a width of paths in which the sensor signal lines 22 are disposed may be wide. That is, referring to FIG. 5, there is a problem in that a width of places through which a group 100 of the sensor signal lines 22 passes may be wide.

FIG. 9 is an embodiment for solving the above problem. Referring to FIG. 9, a shaded touch detection sensor 10 of FIG. 9 is a sensing pad 10a detecting a touch signal and a non-shaded touch detection sensor 10 is a non-sensing pad 10b not detecting a touch. The non-sensing pad 10b is positioned between the sensing pads 10a and is a zero voltage, a ground voltage, or a DC voltage having a predetermined magnitude. That is, at timing when the sensing pad 10a detects the touch signal, the non-sensing pad 10b is positioned between the sensing pads 10a and the voltage of the non-sensing pad 10b is the zero voltage, the ground voltage, or the DC voltage. The TDI 30 performs a control so that the non-sensing pad 10b is connected to the zero voltage, the ground voltage, or the DC voltage. In this case, like col1 and col2, the sensing pads 10a may be disposed to cross each other or like col3 and col4, the touch signal may be detected at the same row. Like col3 and col4, when the touch signal is detected at the same row, the interference occurs between (C3, R1) and (C4, R1). As a result, as illustrated, it is preferable to dispose a DC line having the zero voltage, the ground voltage, or the DC voltage therebetween.

As illustrated in FIG. 9, when too many touch detection sensors 10 detect the touch signal using an ADC, it takes predetermined time to detect the touch signal, and therefore the touch signal may be lost. Of course, it is possible to fast detect the touch signal by increasing the number of ADCs. However, there is a disadvantage in that when the number of ADCs is increased, a volume of the TDI 30 may be increased and the current consumption may be increased.

To solve the above problem, according to the exemplary embodiment, one sensing pad 10a is disposed in one column. Even in this case, the voltage of the non-sensing pad 10b is the zero voltage/ground voltage/DC voltage. Further, the voltage of the non-sensing pad is the same. That is, all the voltages of the non-sensing pads 10b present in the same column are the zero voltage, the ground voltage, or the DC voltage.

Figure 10:
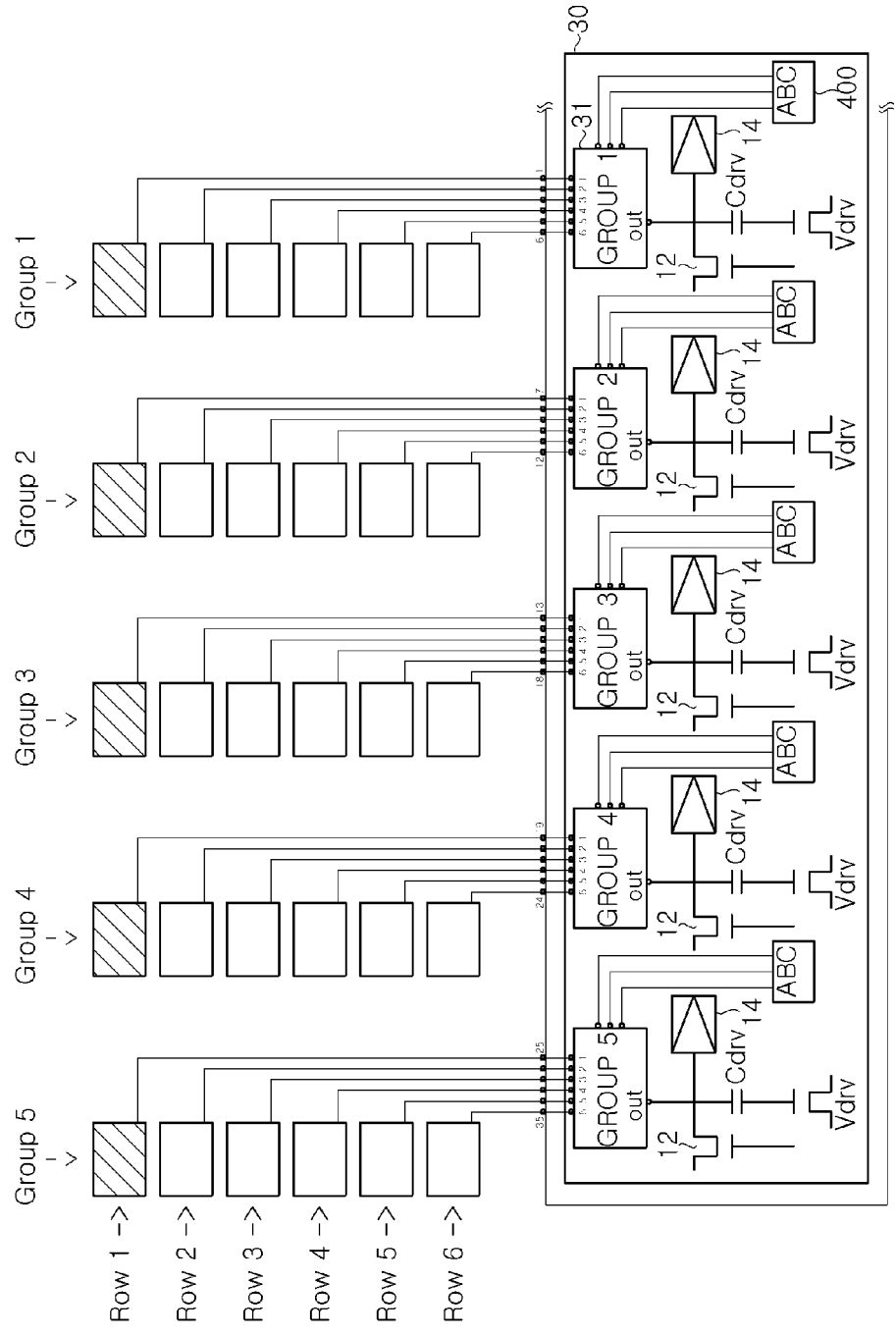
FIG. 10 is a diagram illustrating an embodiment in which a multiplexer according to an exemplary embodiment of the present invention is used.

One of the methods for extracting one sensing pad 10a from a plurality of touch detection sensors included in one column uses one multiplexer (hereinafter, referred to as mux). FIG. 10 illustrates an embodiment of the use of the multiplexer. The embodiment of FIG. 10 describes an example in which five groups each include six touch detection sensors 10, which is an embodiment for explanation. Actually, more groups may be present and more touch detection sensors 10 may be added even in these groups.

In the embodiment of FIG. 10, the group is a set of the touch detection sensors 10 sharing a multiplexer 31. The multiplexer 31 is a 6 in×1 out type of outputting one signal for six inputs. In the actual use example, the multiplexer may select various embodiments like a case of 20 in×1 out (select one of 20 inputs) or a case of 30 in×1 out (select one of 30 inputs).

To select one of several signals input to the multiplexer 31, a select control is required. To select one of the four input signals, two select signals are required and to select one of eight input signals, three select signals are required. In the embodiment of FIG. 10, one output signal of the six input signals is determined and therefore at least three selection signals are required, which is represented by "A, B, C". If all the selection signals are commonly applied to the multiplexer 31, even if there is only a selection signal generator 400, the selection signal generator 400 is commonly applied to all the multiplexers and therefore a circuit for the selection signal generator is simple and the TDI 30 is also simple. Therefore, according to the present invention, the selection signal generated from one selection signal generator is commonly applied to all the multiplexers.

Further, for simplification of a circuit, the multiplexer 31 preferably uses the same type. The same type of multiplexer means the case in which 1) the number of inputs is the same, 2) the number of outputs is the same, 3) the number of selection signals is the same, and 4) an order of the input signals selected for any selection signal is the same. (That is, this means that when ABC is HLL, a fourth signal of the six signals input to the mux is selected and the fourth signal is output). For this purpose, all the multiplexers use the same selection signal.

All the multiplexers according to the present invention are the same type, and therefore a method for connecting the touch detection sensor 10 to the multiplexer in a group connected to the multiplexer 31 is also the same. Referring again to FIG. 10, Row 1 is allocated to all No. 1 inputs of a multiplexer 30a and Row 2 is allocated to all No. 2 inputs of the multiplexer. Row 6 which is final is allocated to No. 6 input of the multiplexer. The wiring method is the same in all the multiplexers. The present invention uses a plurality of multiplexers and uses the same selection signal, such that one multiplexer selects one input signal. Therefore, except for the case in which a re-map method is not used, the touch detection sensor 10 that is present in the same row is used to detect the touch signal. In this case, all the rest touch detection sensors 10 other than the touch detection sensors 10 present in the same row used to detect the touch are connected to the zero voltage, the ground voltage, or the predetermined DC voltage. Further, the voltage of the non-sensing pad 10b is the same zero voltage, the same ground voltage, or the same DC voltage.

Referring again to FIG. 10, one multiplexer is used in one group and therefore as an input pin of the TDI 30, the same number of pins is allocated to each group. For example, there are six touch detection sensors 10 in five groups illustrated in FIG. 10, respectively, and therefore six connection pins are allocated to one group in the TDI 30. This means that the same number of pins such as Nos. 1 to 6, Nos. 7 to 12, etc., is allocated in FIG. 10.

Further, there is a group to which the pin having the same number of inputs is allocated in the TDI 30. Referring to FIG. 10, since Nos. 1 to 6 pins are group 1, Nos. 7 to 12 pins are group 2, and Nos. 25 to 30 pins are group 5, six pins are identically allocated to five groups. There may be a case in which several inputs are added to any group and thus the number of pins is increased. Even in this case, the same multiplexer may be used.

Further, the input pins is connected to the corresponding group in TDI 30, that is, to the corresponding multiplexer in TDI 30. For example, signals of Nos. 7 to 30 pins of other groups may not be interposed among Nos. 1 to 6 input pins of the TDI in which the group 1 is disposed. This is a scheme for selecting the same input signal by the same selection signal to use the touch detection sensors 10 of the same row for the touch signal detection so as to easily operate an ADC, an amplifier, etc., based on a rule. Therefore, a tendency to increase (or decrease) a Row number selected as the pin number in the TDI 30 for each group is increased (or decreased) is the same. That is, this means that the tendency to increase a row number selected as the pin number of the TDI is increased in the group 1 is identically applied to all the groups.

In this situation, since the row and column selected to detect the touch signal are regular, when the touch signals stored in memory units 28 one-to-one mapped to each touch detection sensor 10 are read, it is possible to perform a required operation using the touch signal without any manipulation. (Required operation may extract touch coordinates). For example, if the touch signals are detected in (C3, R3) and (C3, R4), these touch signals are signals detected by two continued sensors and even in the memory unit 28, the touch signals are continuously stored in the corresponding memory and therefore it is possible to obtain touch coordinates even if the operation such as the re-map (process of re-mapping the touch signals stored in the memory unit to coincide with the map of the touch sensors) is not performed.

The touch signal detection method according to the present invention is to detect whether the touch is performed at the touch pad including the plurality of touch detection sensors arranged in a matrix form.

The touch signal detection method according to the exemplary embodiment of the present invention includes a touch detecting step of detecting the touch signal received through the plurality of touch signal lines connected to each touch detection sensor to transfer the touch signals to determine whether the conductor performs a touch and is performed by the touch detection unit or the level shift detection unit 14.

The touch pad further includes at least one separation signal line 300 having a predetermined constant width that is not connected to the touch detection sensor between the respective rows of the touch detection sensor and between the touch signal lines connected to the touch detection sensor of the corresponding row.

The separation signal line is connected to the zero voltage, the ground voltage, or the constant DC voltage.

In the touch detecting step, the touch signals are sequentially detected in a column unit of the touch detection sensor, in which each column of the touch detection sensor is divided into at least one sensing pad upon the detection of the touch signal—the touch detection sensor simultaneously determining whether the touch is performed by the touch detection unit and the plurality of non-sensing pads—the touch detection sensor not simultaneously determining whether the touch is performed upon determining whether the touch is performed by the sensing pad.

The non-sensing pad is connected to the zero voltage, the ground voltage, or the constant DC voltage.

Upon detecting the touch signal, the positions of the rows of the sensing pad and the non-sensing pad may be different in each column or may be the same in each column.

The sensing pad in each column is plural and at least one non-sensing pad is positioned between the sensing pads.

The non-sensing pad is connected to the zero voltage, the ground voltage, or the constant DC voltage.

This is a method for more easily removing the interference between the signal lines than a method for removing the parasitic capacitance between the signal lines, having the separate separation signal line disposed therebetween.

That is, the non-sensing pad is disposed between the sensing pads and thus the non-sensing pad may serve as the separate separation signal line.

In detail, the non-sensing pad serves to separate between the sensing pads and the touch signal line connected to the non-sensing pad serves as the separation signal line separating the touch signal line connected to the sensing pad.

Therefore, there is no disadvantage in that the group of the signal lines is increased, thereby obtaining the preferred effect of removing the interference between the signal lines.

The sensing pad is one per each column, the rest sensing pads may be configured to become the non-sensing pad, and the non-sensing pad is connected to the zero voltage, the ground voltage, or the constant DC voltage.

In particular, all the non-sensing pads are connected to have the same voltage.

Further, describing in detail the touch detecting step, the touch detecting step includes: a step of charging, by the charging means, the parasitic capacitance Cp and the driving capacitance Cdrv present in the touch detection sensor and a touch capacitance Ct generated by the conductor; a step of applying, by the alternating voltage applying unit, the alternating voltage to the touch detection sensor; and a level shift detecting step of comparing, by the level shift detection unit, the voltage variation at the touch detection sensor when the touch is not performed with the voltage variation at the touch detection sensor when the touch is performed to determine whether the touch is performed.

The charging means is turned off after the completion of the charging to apply the alternating voltage in a state in which the parasitic capacitance Cp, the driving capacitance Cdrv, and the touch capacitance Ct are maintained in a floating state and the input terminal of the level shift detection unit maintains the high impedance (Hi-Z) state upon the determination on whether the touch is performed.

The voltage variation at the touch detection sensor when the touch is performed is smaller than the voltage variation at the touch detection sensor when the touch is not performed and the voltage fluctuation at the touch detection sensor when the touch is performed and the voltage fluctuation at the touch detection sensor when the touch is not performed are generated by being linked with a rising edge and a falling edge of the applied alternating voltage.

Figure 11:
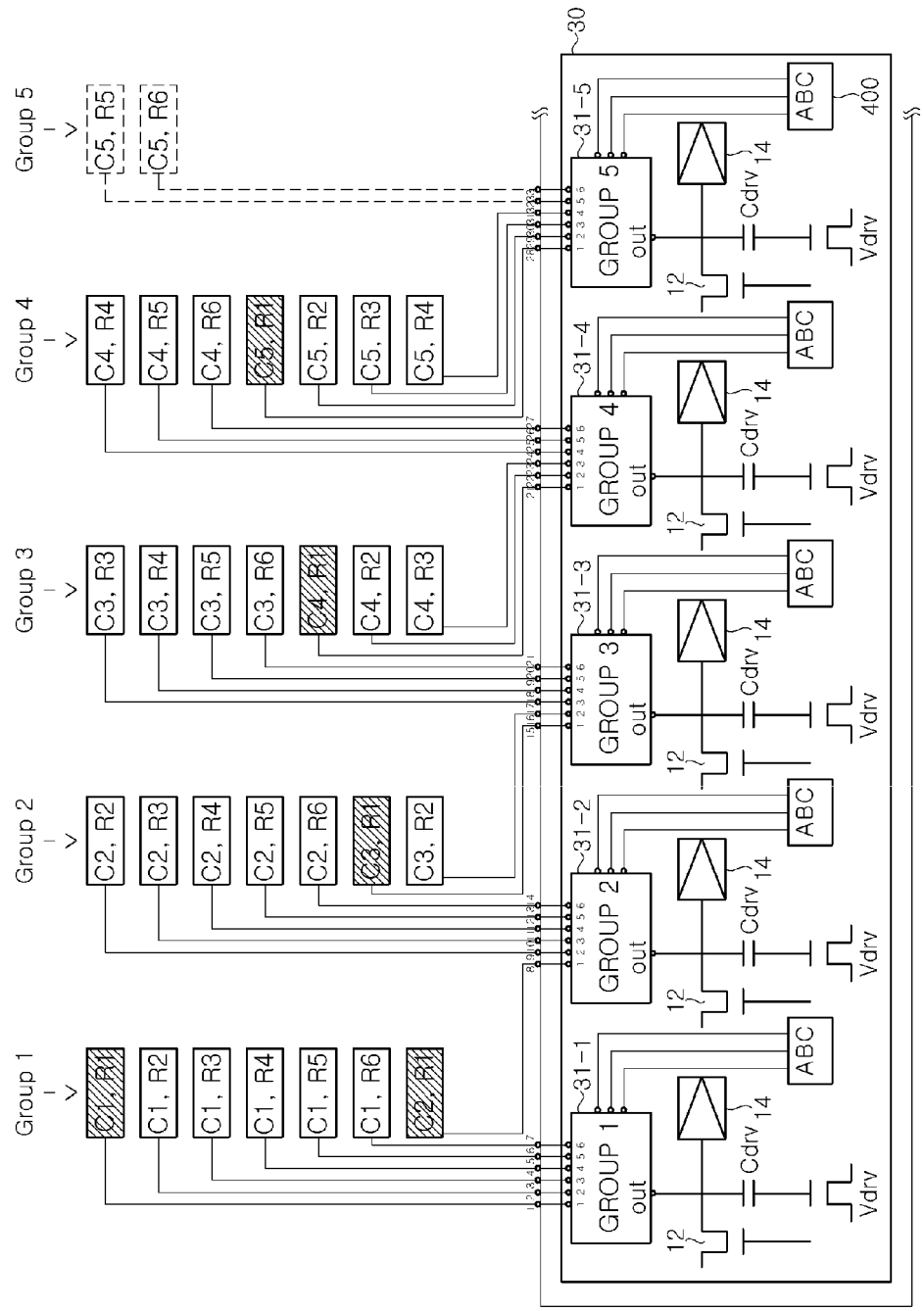
FIG. 11 is a diagram to represent a connection between a touch panel and a touch drive IC (TDI) for describing re-map.

FIG. 11 illustrates an embodiment of the re-map of FIG. 10.

The re-map used in the present invention means an operation process such as a process of re-mapping the touch signal stored in the memory unit of the TDI to match the map of the touch detection sensor. To accurately calculate the touch coordinates when the conductor performs the touch during the re-map process, a series of operation processes to match the touch detection signal stored in the memory unit of the TDI with the map of the touch detection sensor need to be additionally performed.

The re-map process is performed when the TDI adopted to detect the touch in the display device having an array of X×Y touch detection sensors is not optimized for an X×Y structure.

Describing in detail this with reference to FIG. 10, there are six touch detection sensors 10 in five groups, respectively and therefore six input pins are allocated to one group (or mux) in the TDI 30. That is, it means that the multiplexers having the same number of input pins are each allocated to six touch signal lines configuring one column such as Nos. 1 to 6, Nos. 7 to 12, etc., in FIG. 10 to configure the TDI. The embodiment of FIG. 10 does not require the separate operation process of the re-map described above.

However, unlike the embodiment of FIG. 10, the re-map may be occurred in the case in which each multiplexer of the group configuring the TDI does not completely accommodate one group of the signal lines connected to the touch detection sensors which is located on the same column and the non-accommodated signal lines are connected to the next multiplexer.

As the size of the display device is increased, the touch detection sensor 10 is added in a horizontal or vertical direction or in both of the horizontal and vertical directions, such that the number of TDIs may be increased. When a resolution of the touch detection sensor optimized for, for example, a 7-inch display device is 20×20, to use the same TDI as the TDI used for the 7-inch display device in a 14-inch display device, the 14-inch display device requires four more TDIs, compared to the number of TDIs used for the 7-inch display device.

Further, if the size of the display device is slightly more increased to 8-inch than the 7-inch display device, the disposition of the touch detection sensors of 20 in width and 22 in length may be optimum. To this end, the number of TDIs 30 for detecting touch signals in touch detection sensors 10 of the existing resolution of 20×20, that is, 400 is 440 and therefore the number of touches to be detected is increased. Unless the separate TDI capable of accommodating 20×22 is manufactured, if the touch signals are detected by using the TDI used for the 7-inch display device, the number of touch signal detection signals limited to 400 may not be increased, and therefore the resolution of the touch signal detected for one of an X direction and an Y direction may be partially discarded and the case in which the resolution is optimized to only one of the X direction and the Y direction may often happen.

In the case of the 8-inch display device, if it is assumed that the disposition of a 18×22 touch detection sensor is optimum, it is assumed that in the touch resolution of X×Y (or width×length), an X (or width) is the number of groups and the number of Y (or length) is the number of touch detection sensors 10 included in one group. To use the TDI 30 designed to be optimized for a configuration of a 20×20 touch detection sensors in the 18×22 display device, the re-map technology needs to be used. The present invention provides a technical idea associated therewith.

FIG. 11 is an embodiment for re-mapping the touch detection sensors 10 in which only the sensor signal line 22 is disposed from the right to the left in the embodiment of FIG. 10.

In the case in which the touch resolution in the horizontal direction is more important, the display device of the array in which six or seven columns in the horizontal direction are disposed and the number of sensors in the vertical direction is reduced may be used.

The touch signal detection apparatus and the touch signal detection method according to the present invention may increase the touch detection resolution by connecting the touch detection sensors 10 used in other groups in the vertical direction.

As illustrated in the embodiment of FIG. 11, according to the present invention, the sensor signal line may be disposed at the left or the right of the touch detection sensor 10.

The TDI 30 used in the embodiment of FIG. 10 is the case in which each of the five mux groups may accommodate six touch detection sensors 10, that is, six touch signal lines.

FIG. 11 is a diagram for describing re-map and illustrates an example in which the TDI 30 optimized for the touch detection sensor of 6×5 array is adopted to be used in the touch detection sensor of 4×7 array.

In detail, each mux group does not accommodate all the touch signal lines of each column but the overall number of input pins of the TDI 30 may accommodate all the touch signal lines of the touch detection sensor.

As illustrated in FIG. 11, the touch signal of the touch detection sensor of (C2, R1) of a first column is not received by a mux 31-1 of group 1 but is received by a mux 31-2 of group 2.

Similarly, the touch signals of the touch detection sensor of (C3, R1) and (C3, R2) of a second column are not received by the mux 31-2 of group 2 but are received by a mux 31-3 of group 3.

Further, (C4, R1), (C4, R2), and (C4, R3) of a third column are not received by the mux 31-3 of group 3 and are received by a mux 31-4 of group 4.

Seven touch signal lines of each column in FIG. 11 are not individually accommodated in each mux group having six input pins but 28 touch signal lines all may be accommodated in the mux group having a total of 30 input pins.

Two input pins of the mux of group 5 are maintained in the state in which they are not connected to the touch signal lines.

The operation of the mux in FIG. 11 is identically operated as described in FIG. 10. That is, one output is discharged by the selection signal generated from the selection signal generator 400 and the same selection signal may be adopted for all mux groups. In this case, the touch detection sensors 10 present in the same row are selected to detect the touch signals.

When the same selection signal is selected, the touch detection sensors simultaneously detected by the TDI become (C1, R1), (C2, R1), (C3, R1), (C4, R1), and (C5, R1). As different results from the disposition of the touch detection sensor of FIG. 10, the touch detection sensors of the same row in FIG. 10 are selected even by the same selection signal but differently from FIG. 10, in FIG. 11, it may be confirmed that the touch detection sensor is selected in other rows (shaded portions of FIG. 11).

In other words, the re-map technology of the present invention breaks the rules of scanning for each of the same rows and simultaneously scans the touch detection sensors at several rows.

The shaded portion of FIG. 11 as Row1 of FIG. 10 and are the sensors 10 scanned at the first time but illustrates an appearance that the row is changed by the re-map. Further, only one sensor 10 is not selected in one column, but referring to the left column of FIG. 11, two sensors 10 may also be selected in one column. Even when the two touch detection sensors are simultaneously selected in the touch detection sensor of column 1, the sensor signal lines 22 (signal line 2 to signal line 6) between two sensors are connected to a DC power supply and therefore the two sensors (C1, R1) and (C2, R1) are not affected by each other.

It is assumed that the touch is performed under the re-map environment of the sensor 10 as illustrated in FIG. 11 and thus the touch area as illustrated in FIG. 12A is detected.

The touch detection sensor 10 may perform the re-map, but a specific area (hereinafter, frame memory) of a memory unit 28 one-to-one mapped with the touch detection sensor 10 in the TDI 30 may not perform the re-map, and therefore when the frame memory of the memory unit 28 of the TDI 30 is read, the frame memory may be read as illustrated in FIG. 12B.

The memory unit 28 differentially stores the touch signals received in the muxes of each group, which is stored and read as illustrated in FIG. 12B.

That is, the (C2, R1) of FIG. 11 is disposed in group 1 in the touch detection sensor, but the sensor signal line connected to the (C2, R1) is connected to the mux of group 2 and is stored in row 1 of column 2 as illustrated in FIG. 12B.

Similarly, each position of (C3, R1), (C3, R2), (C4, R1), (C4, R2), (C4, R3), (C5, R1), (C5, R2), (C5, R3), (C5, R4) etc., is changed in the group in the touch detection sensor and the mux group.

It is impossible to extract the touch coordinates using the touch signals under the situation illustrated in FIG. 12B, that is, the situation in which the touch signals are individually separated and therefore the re-map needs to be performed in the RAM area of the memory unit 28 by the frame memory as illustrated in FIG. 12A.

In the present invention, the frame memory in the memory unit 28 is associated with the group of muxes, which is not necessarily the same as the frame memory of the touch detection sensor.

When the frame memories of the memory unit 28 are not one-to-on mapped to the frame memories of the touch detection sensor, an additional re-map process in the RAM area of the memory unit 28 is required.

That is, according to the present invention, raw data stored in the memory is re-mapped to be mapped to the re-mapped touch detection sensors 10 based on the raw data one-to-one mapped to the touch detection sensors 10.

The re-map process is called a process of re-mapping the frame memory of the memory unit depending on the column coordinates of the touch detection sensor.

According to the touch signal detection apparatus and the touch signal detection method according to the present invention, it is possible to save the production costs of the TDI.

According to the touch signal detection apparatus according to the present invention, when the overall number of input pins of the multiplexer is more than the overall number of touch signal lines of the touch detection sensor, but the number of input pins receiving the touch signals of each multiplexer is less than the number of touch signal lines in each column of the touch detection sensors connected to the input pins, the TDI used when the number of columns of the touch detection sensor is one-to-one mapped to the number of input pins of each multiplexer may be used as it is.

The re-map which is a feature of the present invention is called the process of matching the touch signals stored in the memory unit with the array of the touch detection sensors. The re-map process re-arrays the touch signals stored in the memory unit based on the coordinates of the column of the touch detection sensor.

As set forth above, according to the touch signal detection apparatus and the touch signal detection method according to the present invention, one touch signal detection apparatus may be widely used for the touch detection sensor having different arrays by using a re-map technology.

According to the touch signal detection apparatus and the touch signal detection method according to the present invention, it is possible to save costs using the same touch signal detection apparatus without producing the separate touch signal detection apparatus for the display device including the touch detection sensor having different arrays.

As described above, it may be appreciated that the basic technical spirit of the present invention is based on the juice extraction module for juice capable of more finely crushing the dregs of the raw materials to improve the juice-extracted efficiency and more improve the texture of juice.

In addition, various modifications and applications may be made by those skilled in the art without departing from the scope of the basic technical spirit of the present invention.

What is claimed is:

1. A touch signal detection apparatus detecting whether a touch is performed at a touch pad including a plurality of touch detection sensors arranged in a matrix form, the touch signal detection apparatus comprising:
   a plurality of touch signal lines configured to connect the plurality of touch detection sensors, respectively;
   a plurality of multiplexers, each of the multiplexer including a multiplicity of input pins and configured to receive, through the input pins, touch signals generated from touch detection sensors through touch signal lines coupled to the input pins and output one of the received touch signals in response to a selection signal;
   at least one selection signal generator configured to generate the selection signal;
   a memory unit configured to receive and store touch signals output from the plurality of multiplexers, a storage array of the memory unit being different from an array of the touch detection sensors;
   a touch detection unit configured to read the touch signals stored in the memory unit and detect whether the touch is performed at the touch pad,
   wherein each of the multiplexers has a number of input pins to receive touch signals,
   wherein, when the number of input pins of each of the multiplexers is different from the number of touch signal lines at each column in the matrix form, at least one of the multiplexers receives, through a re-map process, one or more touch signals from touch detection sensors belonging to one or more columns other than a column corresponding to the at least one of the multiplexers, and
   wherein the re-map process matches the plurality of touch signal lines with input pins of the multiplexers based on a difference between the number of touch signal lines at each column and the number of input pins of a multiplexer corresponding to each column.

2. The touch signal detection apparatus of claim 1, wherein the memory unit separates and stores the touch signals into groups depending on outputs of the multiplexers.

3. The touch signal detection apparatus of claim 1, wherein the re-map process re-arrays the touch signals stored in the memory unit based on coordinates of the touch detection sensors in the matrix form.

4. The touch signal detection apparatus of claim 1, wherein a touch detection resolution is changed by changing positions of the touch detection sensors that are positioned at different columns or different rows in a horizontal direction or a vertical direction, and
   wherein when the touch detection resolution is changed, the touch detection sensors are scanned at several rows.

5. The touch signal detection apparatus of claim 1, further comprising:
   a charging means charging a parasitic capacitance Cp and a driving capacitance Cdrv present in the touch pad and a touch capacitance Ct formed between a touch detection sensor and a touch input tool;
   an alternating voltage applying unit applying an alternating voltage to the touch detection sensor; and
   a level shift detection unit comparing a voltage variation at the touch detection sensor when the touch is not performed with a voltage variation at the touch detection sensor when the touch is performed to determine whether the touch is performed.

6. The touch signal detection apparatus of claim 5, wherein the charging means is turned off after the completion of the charging to apply the alternating voltage in a state in which the parasitic capacitance Cp, the driving capacitance Cdrv, and the touch capacitance Ct are maintained in a floating state.

7. A touch signal detection method detecting whether a touch is performed at a touch pad including a plurality of touch detection sensors arranged in a matrix form, the touch signal detection method comprising:
   receiving, by a plurality of multiplexers, touch signals generated from the plurality of touch detection sensors through a plurality of touch signal lines, wherein the plurality of touch signal lines are connected to the touch detection sensors, respectively;
   outputting, by each of the plurality of multiplexers, one of the received touch signals in response to a selection signal, wherein the selection signal is generated from at least one selection signal generator;
   receiving and storing, by a memory unit, touch signals output from the plurality of multiplexers, a storage array of the memory unit being different from an array of the touch detection sensors;
   reading, by a touch detection unit, the touch signals stored in the memory unit; and detecting, by the touch detection unit, whether the touch is performed at the touch pad, wherein each of the multiplexers has a number of input pins to receive touch signals, wherein, when the number of input pins of each of the multiplexers is different from the number of touch signal lines at each column in the matrix form, at least one of the multiplexers receives, through a re-map process, one or more touch signals from touch detection sensors belonging to one or more columns other than a column corresponding to the at least one of the multiplexers, and wherein the re-map process matches the plurality of touch signal lines with input pins of the multiplexers based on a difference between the number of touch signal lines at each column and the number of input pins of a multiplexer corresponding to each column.

8. The touch signal detection method of claim 7, wherein the memory unit separates and stores the touch signals into groups depending on outputs of the multiplexers.

9. The touch signal detection method of claim 7, wherein the re-map process re-arrays the touch signals stored in the memory unit based on coordinates of the touch detection sensors in the matrix form.

10. The touch signal detection method of claim 7, wherein the touch detecting step includes:

charging, by a charging means, a parasitic capacitance Cp and a driving capacitance Cdrv present in the touch pad and a touch capacitance Ct generated by a conductor;

applying, by an alternating voltage applying unit, an alternating voltage to a touch detection sensor; and comparing, by a level shift detection unit, a voltage variation at the touch detection sensor when the touch is not performed with a voltage variation at the touch detection sensor when the touch is performed to determine whether the touch is performed.

11. The touch signal detection method of claim 10, wherein the charging means is turned off after the completion of the charging to apply the alternating voltage in a state in which the parasitic capacitance Cp, the driving capacitance Cdrv, and the touch capacitance Ct are maintained in a floating state.

12. The touch signal detection method of claim 10, wherein an input terminal of the level shift detection unit maintains a high impedance (Hi-Z) state upon the determination on whether the touch is performed.

13. The touch signal detection method of claim 10, wherein the voltage variation at the touch detection sensor when the touch is performed is smaller than that at the touch detection sensor when the touch is not performed.

* * * * *